United States Patent [19]

Kamada

[11] 4,132,312
[45] Jan. 2, 1979

[54] PACKAGING UNIT FOR USE IN THE MARKETING OF ALARM SYSTEMS

[76] Inventor: Daikichi Kamada, 8-9, 3 chome, Nakahama, Joto-ku, Osaka, Japan

[21] Appl. No.: 885,633

[22] Filed: Mar. 13, 1978

[51] Int. Cl.² .................. B65D 73/00; G09B 25/00
[52] U.S. Cl. ........................................ 206/461; 35/49; 206/457
[58] Field of Search ............ 35/13, 19 A, 49, 51–54; 206/223, 319, 321, 328, 457, 461, 470–471; 340/274 R

[56] References Cited

U.S. PATENT DOCUMENTS

| | | | |
|---|---|---|---|
| D. 176,574 | 1/1956 | Tucker | 35/19 A X |
| 3,202,279 | 8/1965 | Czerkies et al. | 206/470 |
| 4,020,694 | 5/1977 | Mayhew | 206/461 X |
| 4,026,040 | 5/1977 | Valentine et al. | 35/19 A |

Primary Examiner—Steven E. Lipman
Attorney, Agent, or Firm—Koda and Androlia

[57] ABSTRACT

A packaging unit for use in the marketing of compact alarm systems including a flat supporting sheet, a flat panel smaller than the supporting sheet and pivotally coupled to the supporting sheet along one edge, at least one alarm actuating device provided on said panel adjacent an edge opposite to that coupled to the supporting sheet, at least one actuation response device provided on the flat sheet adjacent the alarm actuating device, at least one alarm device provided on the supporting sheet and coupled to the actuation response device such that the alarm device is actuated by the actuation response device and a means for fixing the alarm device and the actuation response device to the supporting sheet and for fixing the actuating device to the front flat panel.

4 Claims, 2 Drawing Figures

PACKAGING UNIT FOR USE IN THE MARKETING OF ALARM SYSTEMS

BACKGROUND OF THE INVENTION

1. Field of Invention

This invention relates to packaging structures and more particularly to packaging structures for use in marketing of compact alarm systems.

2. Prior Art

Alarm systems used to give warning of an intruder or to announce the arrival of a guest, etc. are presently coming into wide use in private homes and large numbers of alarm systems having various functions are being marketed in store displays. However, since information concerning effective locations and methods of installation suited to the functions of such alarm systems is disseminated in the form of rough sketches and/or written instructions in catalogs or specifications, etc., the average member of the general public is unable to gain a thorough understanding of such information. Thus, even if such a system is purchased, improper installation may result and the system may fail to operate satisfactorily or the system may operate when it is not needed, etc. Such problems occur even if the system is of superior quality and results in a loss of utility. The above described problem especially occurs in the case of housewives who may lack an understanding of electrical and mechanical devices. It is probably not an exaggeration that as a result of the above described problems that such systems are one of a group of products that tend to be shunned by the general public no matter how necessary they may be.

As a solution to such problems, displays which make it possible to understand at a glance the installation and operation of such systems have been placed in stores in order to facilitate an understanding of the systems. Usually, however, due to a lack of familiarity with the system, the customer tends to forget the instructions by the time he has returned home and accordingly must call on a specialist, etc. to install the device.

SUMMARY OF THE INVENTION

Accordingly it is the general object of the present invention to provide a packaging unit which makes it possible for the average layman who purchases an alarm system to install it easily and in a manner which insures that the system will function effectively.

It is still another object of the present invention to provide a packaging unit for use in marketing of compact alarm systems which demonstrates the operation of such alarm system.

In keeping with the principles of the present invention, the objects are accomplished by a unique packaging unit for use in the marketing of compact alarm systems including a flat supporting sheet, a flat panel smaller than the supporting sheet and pivotally coupled to the supporting sheet along one edge at least one alarm actuating device provided on said panel adjacent and edge opposite to the edge coupled to the supporting sheet, at least one actuation response device provided on the flat sheet adjacent the alarm actuating device, at least one alarm device provided on the supporting sheet and coupled to the actuation response device such that the alarm device is actuated by the actuation response device and a means for fixing the alarm device and the actuation response device to the supporting sheet and for fixing the actuating device to the flat panel.

BRIEF DESCRIPTION OF THE DRAWINGS

The above described principles and objects of the present invention will become more apparent with reference to the following description taken in conjunction with the accompanying drawings wherein like reference numerals denote like elements and in which.

DETAILED DESCRIPTION OF THE INVENTION

Figure 1:
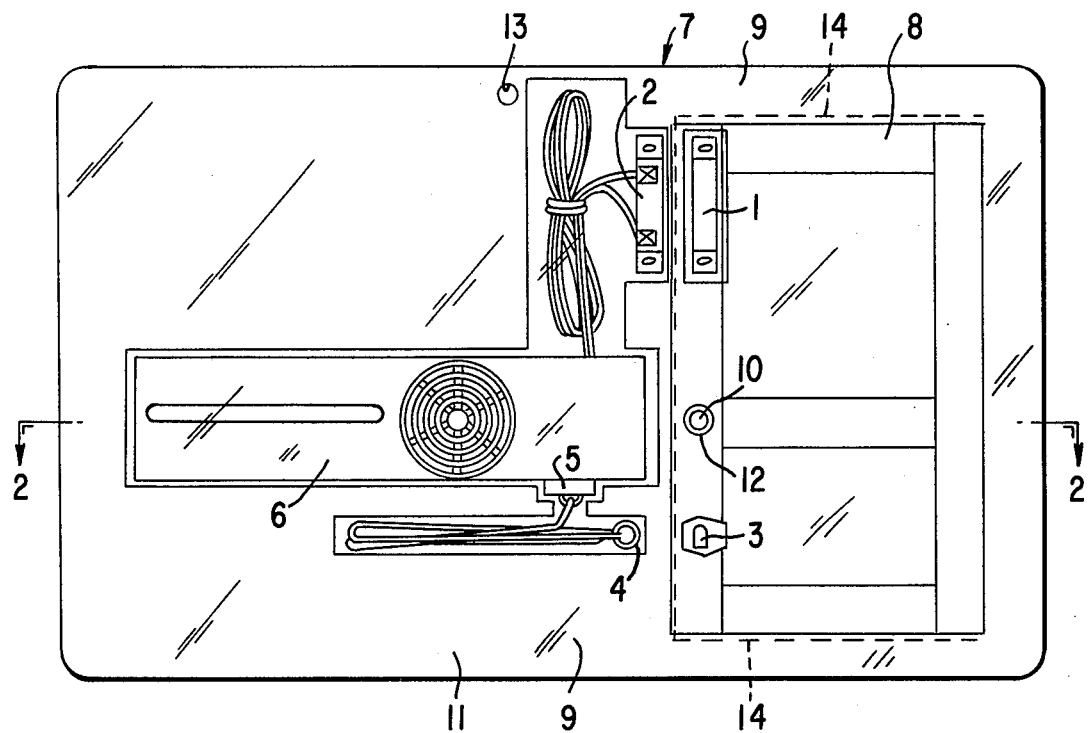
FIG. 1 is a front view of a packaging unit in accordance with the teachings of the present invention.
Figure 2:
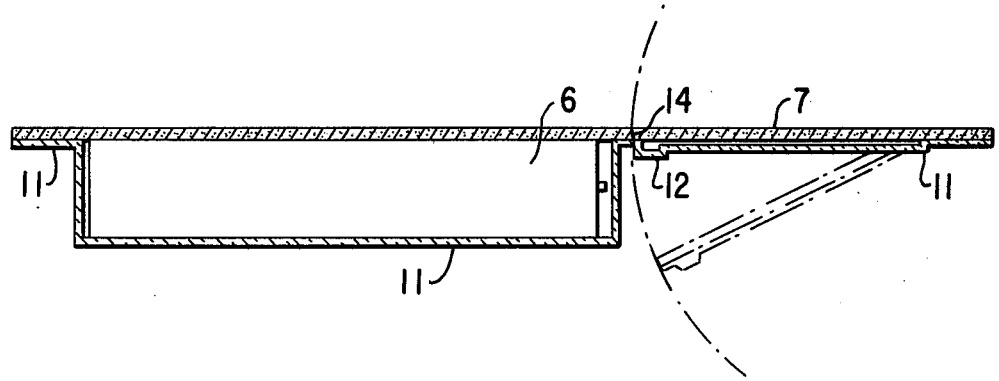
FIG. 2 is a cross-sectional view along the lines 2—2 in FIG. 1.

Referring more particularly to the figures, shown therein is a packaging unit for use in the marketing of compact alarm systems. In the figures the compact alarm includes a magnet 1 and a hook 3 which are alarm actuating devices. A proximity switch 2 and a magnet 5. The magnet 5 is connected by a cord to a hook ring 4 and the proximity switch 2 and the magnet 5 are actuation response devices. An alarm device 6 is also provided and contains its own battery. The proximity switch 2 and the alarm device 6 are coupled together by an electric cord so that the mutual separating and approaching action of the proximity switch 2 and the magnet 1 can be used to announce the arrival of guests. Furthermore the hook ring 4 connected with the magnet 5 can be fit over the hook 3 and the magnet 5 adheres magnetically to a prescribed point on the alarm device 6 inside which another proximity switch is installed. Accordingly, the action of the hook 3 pulling the magnet 5 off the alarm device 6 makes it possible for the alarm system to be used as a burglar alarm.

For the purpose of marketing such an alarm system in a packaged form, a door 8 (a window would also be appropriate) and the surrounding wall area 9 are pictorially or schematically represented on the surface of a flat sheet 7 made of cardboard and furnished with a hole 13 for suspending the packaging unit from a display rack, etc. The appropriate product name, company name, etc. are displayed on the remaining portion of the cardboard sheet. The magnet 1 is positioned on the upper portion of the graphically represented opening and closing portion of the door 8 on the flat sheet 7 namely above the knob 10. The hook 3 is positioned below the knob 10 on the cardboard sheet. The proximity switch 2 is positioned on the wall 9 opposite the magnet 1. Furthermore the alarm device 6 is positioned in any optional position on the wall 9 in the vicinity of the door 8. In this case the hook ring 4 connected to the magnet 5 is positioned in the vicinity of the hook 3.

After the above described parts are positioned on the flat sheet 7 as described above, the surface of the flat sheet 7 is covered with a transparent plastic film 11 which matches the contour of the parts so that the respective parts are fixed in their position. If necessary, a knob shaped projection 12 is formed in the film to cover the knob portion of the door 8. Furthermore, a line of perforations 14 is cut in the unit through the plastic film 11 and the flat sheet 7 around the periphery of the door so that the door 8 can be opened by pushing or pulling.

It should be apparent that the above described embodiment makes it possible to understand at a glance the proper installation positions of the alarm device itself and of the various other parts. Furthermore, if the door 8 is actually opened by pushing along the line of perforations 14, the proximity switch 2 and the magnet 1 are separated from each other so that the magnetic force of the magnet 1 no longer influences the proximity switch 2 and the buzzer of the alarm device 6 accordingly sounds. When the door 8 is closed, the buzzer ceases to sound. Thus, the packaging unit can also provide an actual demonstration of the operation of the alarm system. This makes easy to understand the significance and manner of operation of the magnets and proximity switches which are the principal components of the alarm system and therefore facilitate installation of the system on actual doors, etc.

It should be apparent to one skilled in the art that instead of covering the flat sheet 7 with a transparent film 11 which matches the contours of the various parts, it would be possible to fix the parts to the sheet 7 by some other method such as an adhesive. Furthermore, it should be apparent that a separate panel could be utilized as the door 8 and the panel could be hingingly coupled to the flat sheet 7 along one edge instead of using the perforation construction. If a separate panel is used, the magnet 1, door knob 10, knob shaped projection 12 and hook 3 are provided on the separate panel.

As was described above, this invention consists of a packaging unit for use in the marketing of alarm systems which is designed to facilitate the understanding of its contents. In this unit an illustration indicating proper installation positions is shown on the surface of a flat sheet and the respective parts of the alarm system are positioned on and in accordance with this illustration at points corresponding with actual installation positions. After the parts are thus arranged the entire unit is covered with a transparent plastic film. Furthermore, the unit is designed so that the door portion can actually be opened and closed. Accordingly the customer immediately understands merely by looking at the packaging unit that the product itself is an alarm system, how the system is installed and the proper position for actual installation.

Furthermore, by moving the door portion of the unit, the customer is immediately able to understand how the system works, how it is actuated and how the parts should be installed. Thus, the average layman who purchases such a system is easily able to gain an accurate understanding of the product as a whole by means of this practical illustration without any need to rely upon written instructions. Accordingly, this invention makes it easier for the customer to purchase the product and also attracts the customer to the product. Furthermore, since the customer takes the product home still packaged in the packaging unit, the customer can install the system in accordance with the installation position as illustrated while testing the operation of the system at every step. Accordingly, the system can be easily installed without any danger of improper installation.

It should be apparent to one skilled in the art that the above described embodiment is but merely illustrative of but one of the many possible specific embodiments which represent the applications of the principles of the present invention. Numerous and varied other arrangements can be readily devised by those skilled in the art without departing from the spirit and scope of the invention.

I claim:

1. A packing unit for use in the marketing of compact alarm system comprising:
    a flat supporting sheet, said flat supporting sheet including a smaller panel hingingly coupled to said supporting sheet along one edge;
    at least one alarm actuating device provided on said panel adjacent an edge opposite to that coupled to said supporting sheet;
    at least one actuation response device provided on said flat sheet adjacent said alarm actuating device;
    at least one alarm device provided on said supporting sheet and coupled to said actuation response device such that said alarm device is actuated by the actuation response device; and
    a means for fixing said alarm device and said actuation response device to said supporting sheet and for fixing the actuating device to said smaller panel.

2. A packaging unit for use in the marketing of compact alarm systems according to claim 1 wherein said fixing means comprises a transparent plastic film covering said alarm device, actuation response device and actuating device.

3. A packaging unit for use in the marketing of compact alarm systems according to claim 2 further comprising a hole for suspending the packaging unit.

4. A packaging unit for use in the marketing of compact alarm systems according to claim 3 wherein said flat supporting sheet is made from cardboard.

* * * * *